United States Patent
Goyal et al.

(10) Patent No.: US 10,642,865 B2
(45) Date of Patent: May 5, 2020

(54) BIAS IDENTIFICATION IN SOCIAL NETWORKS POSTS

(71) Applicant: INTERNATIONAL BUSINESS MACHINES CORPORATION, Armonk, NY (US)

(72) Inventors: Munish Goyal, Yorktown Heights, NY (US); Wing L. Leung, Austin, TX (US); Sarbajit K. Rakshit, Kolkata (IN); Kimberly G. Starks, Nashville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 15/413,453

(22) Filed: Jan. 24, 2017

(65) Prior Publication Data

US 2018/0210958 A1 Jul. 26, 2018

(51) Int. Cl.
*G06F 17/30* (2006.01)
*G06F 16/28* (2019.01)
(Continued)

(52) U.S. Cl.
CPC ............ *G06F 16/285* (2019.01); *G06F 16/35* (2019.01); *G06Q 50/01* (2013.01)

(58) Field of Classification Search
CPC ......... G06F 17/30598; G06F 17/30705; G06F 16/24575; G06F 16/24578; G06F 16/248;
(Continued)

(56) References Cited

U.S. PATENT DOCUMENTS

| 9,619,483 B1* | 4/2017 | Robinson ............ G06F 16/1834 |
| 2010/0306249 A1* | 12/2010 | Hill ........................ G06Q 30/02 |
| | | 707/769 |

(Continued)

FOREIGN PATENT DOCUMENTS

WO 2013119819 A1 8/2013

OTHER PUBLICATIONS

List of Google search results for "identify basis in product reviews and social", [retrieved on Aug. 30, 2016]. Retrieved from the Internet: <URL: https://www.google.com/?tbm_pts&gws_rd=ssl#tbm=pts&q_identify+bias+in+product+reviews+and+social+content>.

(Continued)

*Primary Examiner* — Shahid A Alam
(74) *Attorney, Agent, or Firm* — Brian Restauro; Matthew M. Hulihan; Heslin Rothenberg Farley & Mesiti PC

(57) ABSTRACT

Bias identification in social network posts. A method performs a semantic comparison of social network posts by a user of a social network to identify a group of social network posts by the user about a specific topical content category. The method determines a respective semantic sense of each social network post of the group. The method also ascertains a semantic sense pattern among social network posts in the group of social network posts about the specific topical content category. The method identifies a bias in at least one social network post of the group of social network posts based on identifying that the respective semantic sense in each of the at least one social network post deviates from the ascertained sematic sense pattern. The method uses the identified bias to predict bias in one or more other social network posts made by the user on the topical content category.

18 Claims, 7 Drawing Sheets

(51) Int. Cl.
*G06Q 50/00* (2012.01)
*G06F 16/35* (2019.01)

(58) Field of Classification Search
CPC .... G06F 16/285; G06F 16/35; G06F 16/9535; G06Q 50/01
USPC ......................................................... 707/738
See application file for complete search history.

(56) References Cited

U.S. PATENT DOCUMENTS

| | | |
|---|---|---|
| 2012/0197816 A1 | 8/2012 | Short et al. |
| 2013/0013680 A1 | 1/2013 | Gutpa et al. |
| 2013/0218862 A1 | 8/2013 | Ghosh et al. |
| 2013/0227020 A1* | 8/2013 | Ruffner ............. G06Q 30/0201 709/204 |
| 2014/0316856 A1 | 10/2014 | Williams et al. |
| 2014/0317126 A1 | 10/2014 | Work et al. |
| 2015/0120583 A1 | 4/2015 | Zarrella |
| 2015/0205800 A1 | 7/2015 | Work et al. |
| 2017/0124468 A1* | 5/2017 | Bolshinsky ............. G06N 5/047 |
| 2017/0155613 A1 | 6/2017 | Ganci, Jr. et al. |
| 2017/0235830 A1* | 8/2017 | Smith .................... H04L 51/32 707/748 |
| 2017/0308523 A1* | 10/2017 | Wang .................... G06Q 10/10 |

OTHER PUBLICATIONS

Anonymous, "Detection of a Known Contact Currently Using a Mobile Device via Data Aggregation/Analysis and Controlling Access to the Device", IP.com No. IPCOM000238273D, Aug. 13, 2014, 4 pgs.

Anonymous, "Social Data Analysis as Unobtrusive Measure for Validating Human Behavior Assessment or Test (Psychometric) Results", IP.com No. IPCOM000208050D, Jun. 21, 2011, 10 pgs.

Mell, Peter, et al., "The NIST Definition of Cloud Computing", NIST Special Publication 800-145, Sep. 2011, Gaithersburg, MD, 7 pgs.

List of IBM Patents or Applications Treated as Related, Oct. 1, 2019, 2 pgs.

"Bias Identification in Social Network Posts", U.S. Appl. No. 16/519,764, filed Jul. 23, 2019, pp. 1-38.).

* cited by examiner

BIAS IDENTIFICATION IN SOCIAL NETWORKS POSTS

BACKGROUND

It is common for people to exhibit bias toward other persons or objects. Bias refer to an illogical or prejudicial inclination or partiality to a particular side, and may be a positive bias in favor of, or negative bias against, that side. An example of this is when a first individual reacts differently to a particular viewpoint depending on the individual expressing that viewpoint. For instance, the first individual agrees with a second individual expressing the viewpoint but reacts differently (e.g. disagrees) when that viewpoint is expressed by a third individual. The first individual may actively support the activity or expression of the second individual but react differently when a third individual engages in an activity or expression with similar or the same contextual meaning as the activity or expression of the second individual. Here, the first individual has exhibited bias in favor of the second individual and against the third individual. Bias can be exhibited toward any of various things including people, such as famous, powerful or popular celebrities or public figures, products, political parties, objects, and offerings, as examples. The bias may stem from a particular underlying consideration, such as a relationship type (e.g. family, friends, etc.) between the individuals, strength of the relationship, fear, reputation or status of one of the individuals, and so on.

Bias is sometimes exhibited by individuals online, such as in content posted to social networks. Remarks, comments, responses, and other social network posts may include some degree of bias, which may be unrecognizable when taken on its face. Consequently, these posts can give social network users a misleading view of the social content.

SUMMARY

Shortcomings of the prior art are overcome and additional advantages are provided through the provision of a computer-implemented method. The method performs a semantic comparison of social network posts by a user of a social network to identify a group of social network posts by the user about a specific topical content category. The method determines a respective semantic sense of each social network post of the group. The method also ascertains a semantic sense pattern among social network posts in the group of social network posts about the specific topical content category. The method identifies a bias in at least one social network post of the group of social network posts based on identifying that the respective semantic sense in each of the at least one social network post deviates from the ascertained sematic sense pattern. The method uses the identified bias to predict bias in one or more other social network posts made by the user on the topical content category.

Further, a computer program product including a computer readable storage medium readable by a processor and storing instructions for execution by the processor is provided for performing a method. The method performs a semantic comparison of social network posts by a user of a social network to identify a group of social network posts by the user about a specific topical content category. The method determines a respective semantic sense of each social network post of the group. The method also ascertains a semantic sense pattern among social network posts in the group of social network posts about the specific topical content category. The method identifies a bias in at least one social network post of the group of social network posts based on identifying that the respective semantic sense in each of the at least one social network post deviates from the ascertained sematic sense pattern. The method uses the identified bias to predict bias in one or more other social network posts made by the user on the topical content category.

Yet further, a computer system is provided that includes a memory and a processor in communications with the memory, wherein the computer system is configured to perform a method. The method performs a semantic comparison of social network posts by a user of a social network to identify a group of social network posts by the user about a specific topical content category. The method determines a respective semantic sense of each social network post of the group. The method also ascertains a semantic sense pattern among social network posts in the group of social network posts about the specific topical content category. The method identifies a bias in at least one social network post of the group of social network posts based on identifying that the respective semantic sense in each of the at least one social network post deviates from the ascertained sematic sense pattern. The method uses the identified bias to predict bias in one or more other social network posts made by the user on the topical content category.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Social network data may be used for various analyses, so analyzing data with biased information will give inappropriate results. Described herein are facilities for identifying bias in social network posts by users. Methods and systems described herein can classify the social content analysis with various degrees of bias in order to impact the quality of the data to be used in analysis. Thus, in further aspects, an identified bias may be used during social content analysis to predict and notify of bias in subsequent or other social network posts.

Figure 1:
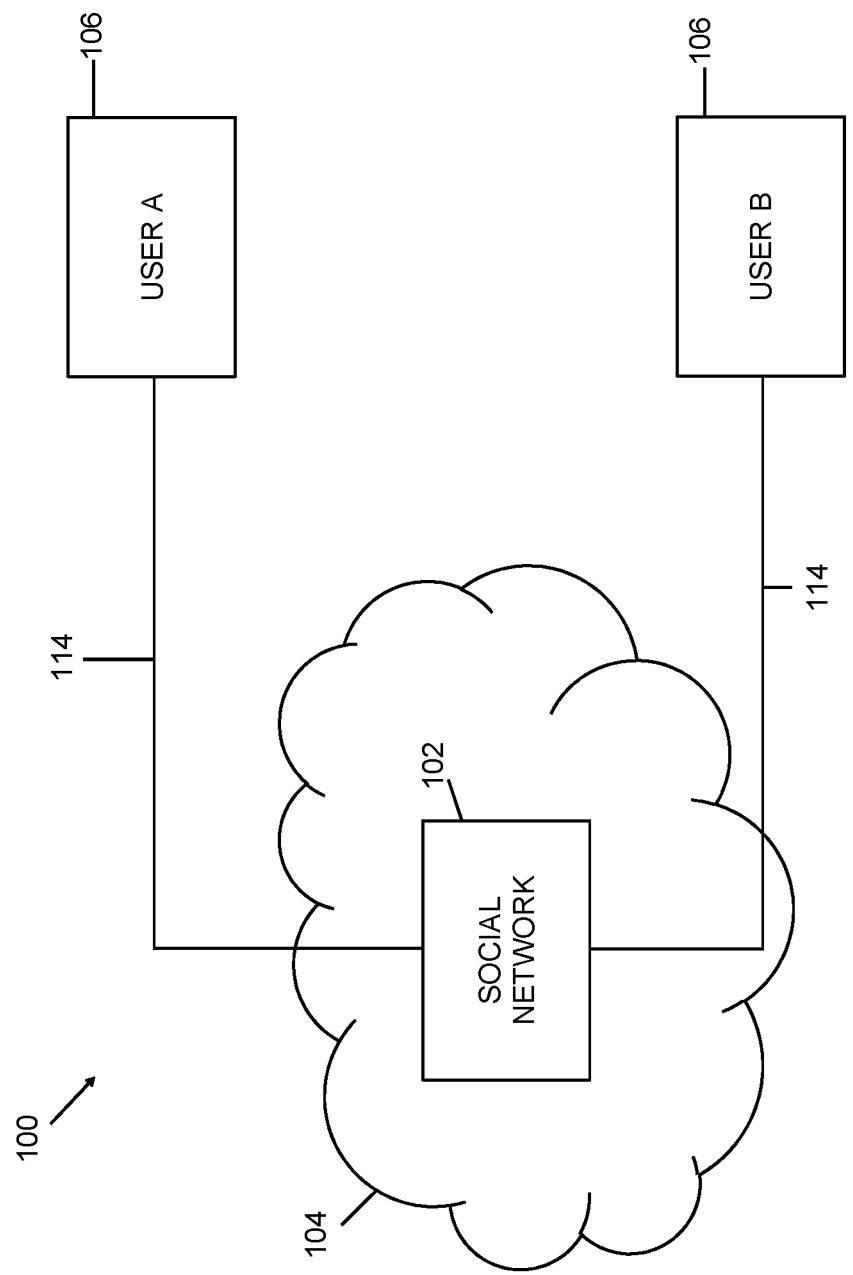
FIG. 1 depicts an example environment to incorporate and use aspects described herein.

FIG. 1 depicts an example environment 100 to incorporate and use aspects described herein. Environment 100 includes a social network 102 in which users post content (messages, media) and interact. The social network 102 is hosted in a cloud environment 104, for instance on social network servers thereof represented by 102. Users 106 communicate with the social network, e.g. via computer systems represented by 106 that connect to the internet to access the social network. As an example, users 106 use computer devices of the environment to interact with each other via the social network, and post digital content such as messages, replies, likes, dislikes, and media.

The components in FIG. 1 form wired or wireless network(s), and communication between the devices takes place via wired or wireless communications links 114 for communicating data between the devices. FIG. 1 is just one example of an environment to incorporate and use aspects described herein.

In some embodiments, software installed on a social network server/platform 102 will perform semantic comparison analysis of posts (such as responses, comments, or feedback to content posted on the social network). This analysis can be performed against posts by different users of the social network. For a given user, the analysis analyzes posts by that user that are responses to social content that has been provided in the form of posts (referred to herein as "target posts") by various other users (referred to herein as "target users"). The responses considered can be responses or feedback to the same or similar type of content posted by the various other users. In other words, for a given topical content category (say, a particular brand of coffee) the analysis will compare the user's responses made to target posts—that is content posted by various other users—about that brand of coffee. The analysis will examine a semantic sense of each of the user's posts/responses—that is the strength of the user's expression for or against the topical content, for instance how strongly the user likes or dislikes that brand of coffee. The software can then identify any semantic deviation in the user's posts responding to the various other users. An example is described below with reference to FIG. 2.

The software can correlate the semantic sense deviation observed in various responses/feedback to any factors that appear to be suggestive of when the user will remain consistent with the semantic sense pattern in making a post and when the user will deviate from the semantic sense pattern in making a post. Example factors include a social or real-life relationship type between the user and the target user, strength of the relationship between the user and the target user, and the particular target user who posted the content that the user is responding to. Accordingly, the analysis will ascertain a pattern of semantic sense and identify a deviation, then identify some factor(s) that appear(s) to reflect when the deviation will be observed. Using the above examples, it may be ascertained that when the user replies to post by the user's family members, the user's tends to agree with the posting family member. By way of example, the user's reply may be agreement that 'Brand X coffee is good', using the example above, but when replying to non-family social network users, the user disagrees, e.g. expresses that Brand coffee is not good. This indicates that the user is biased based on social/real-life relationship type (spouse, sibling, etc.). Additionally or alternatively, the bias may be based on a strength of the relationship between the user and the other social network users, for instance where the user consistently agrees on the topic when responding to close friends and disagrees on the topic when responding to mere acquaintances. Another example factor may be that when the user replies to a specific person, the user consistently agrees or disagrees with that individual, which may or may not be topic-specific. An example would be where the user consistently agrees with or supports the postings by the user's boss on the social network, despite exhibiting a pattern of disagreement with the subject topic(s) when the user replies to others on the social network.

In some aspects, the bias may be identified based on the user's failure to post in response to content posted by others that aligns with the ascertained semantic sense pattern. Software can track the user's historical comments on various topical content categories. The user's silence—failure to respond—on a particular topical content posted by, e.g. a close friend, family member, or reputed individual, may be taken as significant in terms of the user's bias. By way of specific example, assume that the user consistently responds negatively to posts by friends that state that 'Brand X coffee is good', however the user refrains from responding to a post by the user's boss stating that 'Brand X coffee is good'. The system can infer that the user is exhibiting a bias in favor of what the boss says in posts the social network. This inference can extend to just the example (Brand X coffee) or may extend more generally to anything the boss posts, especially when it is determined that the user consistently exhibits a bias in favor of the boss's posts on various other topical content categories.

Software can create a list of identified/predicted biased relationships, types, or other factors that the user has in the social network platform as determined from patterns of bias on various topics. For example, the system can identify that user A tends to disagree with user B on topics related to movie and television reviews (even though the disagreement may not align with user A's agreement with user C on one of those reviews), but user A always supports user B when it is a political discussion (even though it may be inconsistent with user A's political expressions when responding to posts by user D).

The identified bias may be used during social content analysis to identify or predict that a post by the user is biased, and therefore perhaps less trustworthy. Software can identify the content of ongoing interaction between the user and other users, identify factors that might suggest a bias, and check for deviation from the semantic sense pattern among interactions with other users to find a degree of bias if any. This may then be indicated to other viewers viewing the biased post.

Accordingly, aspects described herein provide abilities to detect bias in social media interaction based on contributor responses, and abilities to leverage that in order to identify/predict contributor bias by that user when contributing further in the social media context.

Figure 2:
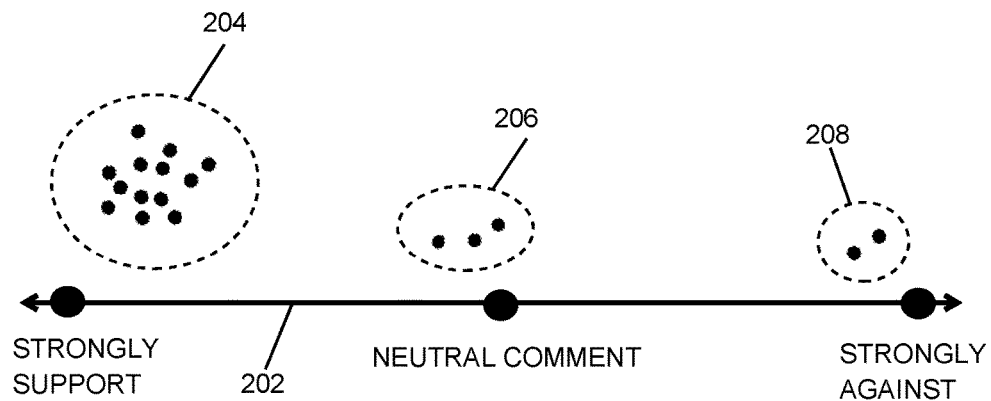
FIG. 2 depicts semantic sense for a group of social network posts by a user about a specific topical content category, in accordance with aspects described herein.

FIG. 2 depicts semantic sense for a group of social network posts by a user about a specific topical content category, in accordance with aspects described herein. The posts are in response to content (posts, media, etc.) submitted by other users to the social networking site. The grouping is identified based on the topical content category to which the user's posts pertain. The user's posts may provide a reply, feedback, comments or the like to the content posted by the other users. Some of the user's posts show strong support for the topic while some show strong opposition. Still other posts may show neutrality. Turning to FIG. 2, semantic sense axis 202 is a spectrum of semantic sense ranging from Strongly Support the content to Strongly Against the content. Each dot in FIG. 2 above the axis represents the semantic sense of a respective social network post by the user about the topical content category. Exhibited in FIG. 2 are different types of semantic feedback by the user in response to posted social content. A clear majority of the posts show that the user strongly supports the content (for instance that 'Brand X coffee is good'). This is reflected in FIG. 2 by grouping 204. A few posts (grouping 206) reflect a neutral feeling about the content (Brand X coffee being good) and two posts (grouping 208) show that the user is strongly against the content, i.e. showing that the user thinks Brand X coffee is not good).

The semantic sense pattern in FIG. 2 is that the user generally supports the idea that Brand X coffee is good. However, some deviation from that semantic sense pattern is reflected at least by posts in grouping 208, and to a lesser extent by posts in grouping 206. FIG. 2 thus illustrates various levels of support and opposition by the user to posted social content. It is noted that FIG. 2 depicts this single user's semantic sense on posts of a specific topical content category. It is noted that a group of posts for a specific topical content category can include the posts about a same topic and, optionally, significantly similar or related topics. For example, if Brand X offers other food items, the user's posts concerning any food item by Brand X, not just Brand X coffee, may be included in the grouping. To the extent that a semantic sense pattern taken across the user's posts concerning Brand X food products may be identified with acceptable statistical certainty, then deviation from that semantic sense pattern might reflect a bias with respect to Brand X food products generally, rather than just Brand X coffee (even though Brand X coffee was the original focus in terms of seeding the topical content category being explored).

Software can gather data for several/all users and several/all content categories. Trends can then be identified showing, for instance, each user's inclination toward one or more users (friends, family, etc.), topics, objects, etc. So, based on the aggregation of semantic responses, the analysis can identify various patterns relating to, as examples:

How deviation in the semantic sense of a user's particular response may be related to the relationship type that user has with the target user who posted the content to which the user posts a response;

How deviation in the semantic sense of a user's particular response may be related to strength of the relationship between the user and the target user;

How the deviation in the semantic sense of a user's particular response may be related to a specific topic category. For example, the user tends to always respond extremely supportive about every brand of coffee, but the user responds with a level mix of support and opposition across all other food categories and brands, as would be expected. This suggests that a subsequent supportive post by the user about a new coffee brand may exhibit a positive bias because the user practically always posts in favor of any brand of coffee.

How the deviation in the semantic sense of a user's particular response may be related to the social reputation, status, or level of power of the target user to whom the user is responding. For instance, when the user responds in the social network to comments posted by any prominent political figure or celebrity, the user's responses may incorporate a positive bias in favor of anything posted by someone of such status.

How the deviation in the semantic sense of a user's particular response may be related to the particular target user to whom the user is responding. In this case, the deviation in semantic sense means that the user changes his or her reply pattern in some cases, e.g. when responding to a particular user. For example, on a same or similar topic, user A reacts very strongly when any of user A's social network friends (except friend user B) post any comment related to the topic, whereas if user B post on the same or similar topic, then user A replies in a different tone, does not reply, shows only partial support, or changes the topic, as examples. Based on this deviation from the identified semantic sense pattern as ascertained from the user's posts to friends other than user B, software can ascertain the degree of bias in user A's posts to user B.

Figure 3:
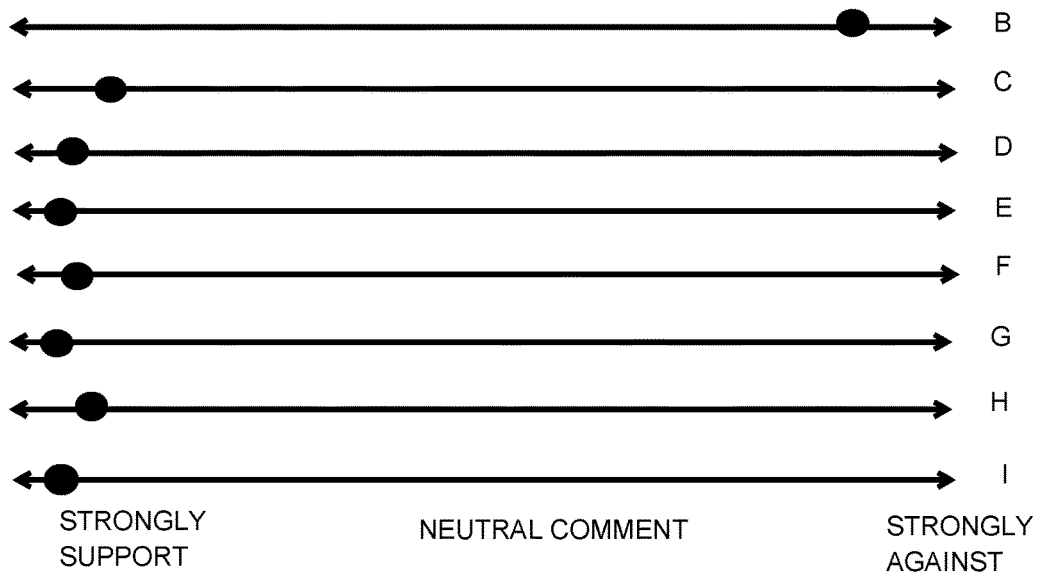
FIG. 3 illustrates a semantic sense pattern among social network posts of a group of social network posts by a user, and deviation from that pattern, in accordance with aspects described herein.

To further illustrate, FIG. 3 illustrates a semantic sense pattern among social network posts of a group of social network posts by a user, and deviation from that pattern, in accordance with aspects described herein. The semantic sense of 8 posts by user A is shown. The 8 posts are in reply to posts of a same or similar topic (topical content category) made by 8 different target users—B through I as shown on the right side. Clearly a semantic sense pattern is exhibited that user A supports the content (e.g. agrees that Brand X coffee is good) as reflected in user A's supportive posts in response to the content posted by users C through I. However, when user B posts a comment on the topic (whether Brand X coffee is good), user A responds against the content (i.e. the Brand X coffee is not good), deviating from the user's semantic sense pattern reflecting that user A likes Brand X coffee. A conclusion that may be drawn, especially if exhibited by user A across several topical content categories when responding to user B, is that user A exhibits bias against the content posted by user B.

Figure 4A:
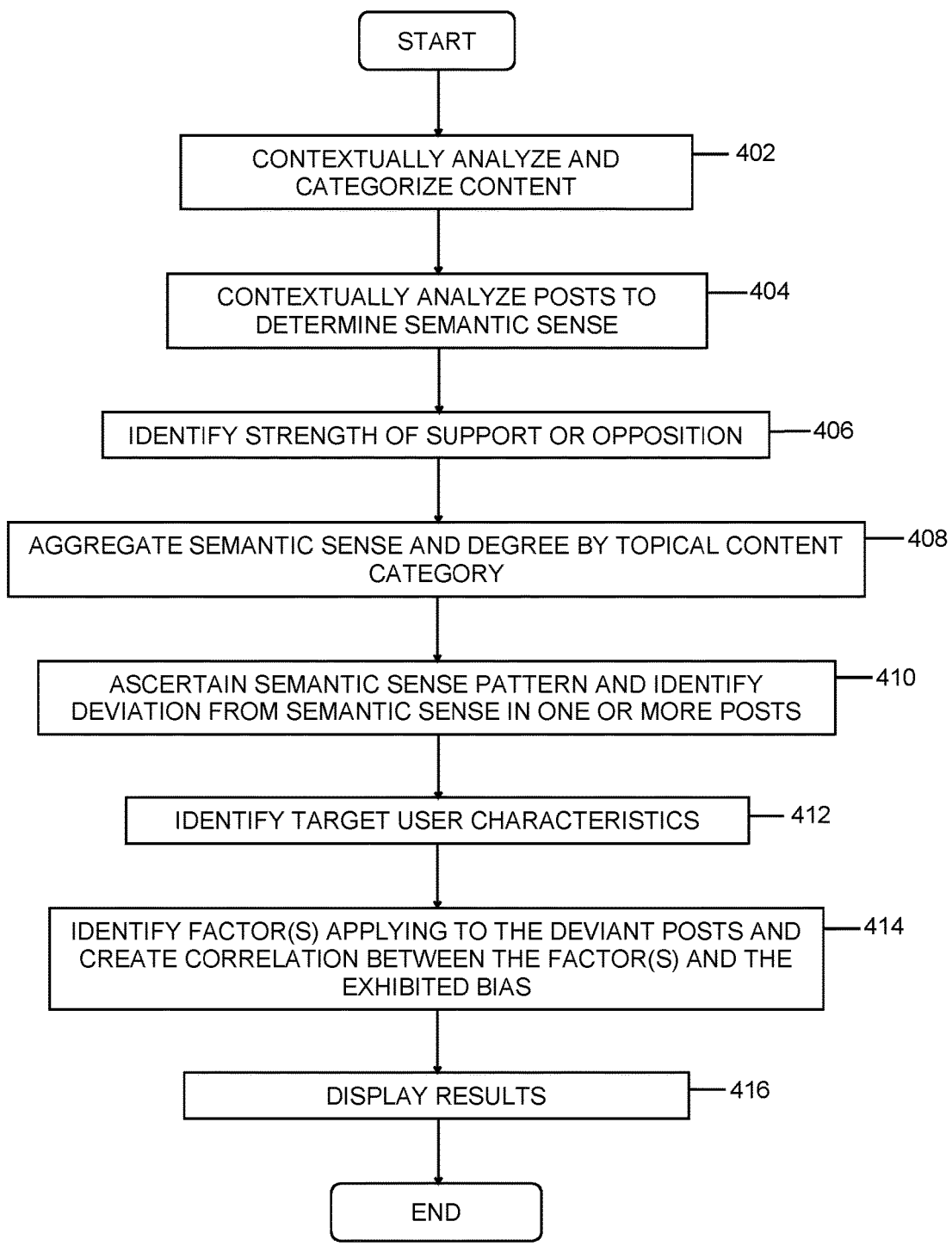
FIG. 4A depicts one example of a process for bias prediction in a social network environment, in accordance with aspects described herein.

FIG. 4A depicts one example of a process for bias prediction in a social network environment, in accordance with aspects described herein. The process may be performed by software installed on a social network server for example, or on a server that accesses data of a social network server. Initially, the process contextually analyzes elements of each of several (possible all) content that is posted to the social network, in order to categorize the content (402). Some content includes replies to other content posted to the social network. The process analyzes the replies to the posted other content and performs contextual analysis to find the semantic sense of each reply (404), for instance whether the user posting the reply is in support of or against the content. Based on the contextual analysis of the replies, the process can identify how strongly the user is in support or opposition (406). The process then aggregates the identified semantic sense (e.g. agree/disagree) with the degree of semantic sense (magnitude of the agreement/disagreement), along with topical content category (408), based on the analyzing the reply. The process can ascertain a pattern of the user's semantic sense in the replies and comments as compared to the subject social content, user, object, etc., and identify deviation from the semantic sense pattern on same or similar types of contents (410).

Based on identifying a deviation from the semantic sense pattern, the process can identify the targeted object(s)/person(s) and their characteristics (relationship to the user, reputation or status, etc.) (412). The deviation, from the semantic sense pattern, exhibited in one or more of the user's posts can be considered reflective of bias in those post(s). The process identifies factor(s) such as relationship type between the user and target user, relationship strength, or any other statistically significant factor present that applies (with some statistically significant frequency) to the one or more posts and will create a correlation between those factor(s) and the user's bias (414). Accordingly, the process identifies one or more points of bias.

During analysis of the social content, the process can consider such points of bias and accordingly display the results (416) in the form of the identified bias type and/or when exhibited. This may be useful when analyzing subsequent posts by the user to the social network. If the system predicts/estimates a bias in a subsequent post, the system may alert viewers of the post that it may be biased, for example.

Accordingly, described herein are facilities for bias identification in social network posts. Aspects described herein provide the ability to detect bias in social media interaction based on contributor responses, and the ability to predict contributor bias in the social media context. A quantification may be made of user-user response bias on a topic of discussion. Behavioral bias may be detected among users on identified topics. Social network users may be clustered into discussion topic groups by degree of response bias. Facilities can additionally provide estimation and prediction of temporal deviation of response bias within a cluster (Dynamic Cluster Migration) and to a networked user's comments on a topic of discussion based on current cluster association. The foregoing present improvements to existing social network technology and offerings, including in the accurate analysis and mining of social network data.

In some embodiments, news outlets and social media sources may use aspects described herein to identify and/or present impartial reporting, and notify users of bias which may be of value to the news outlet and to news readers.

Figure 4B:
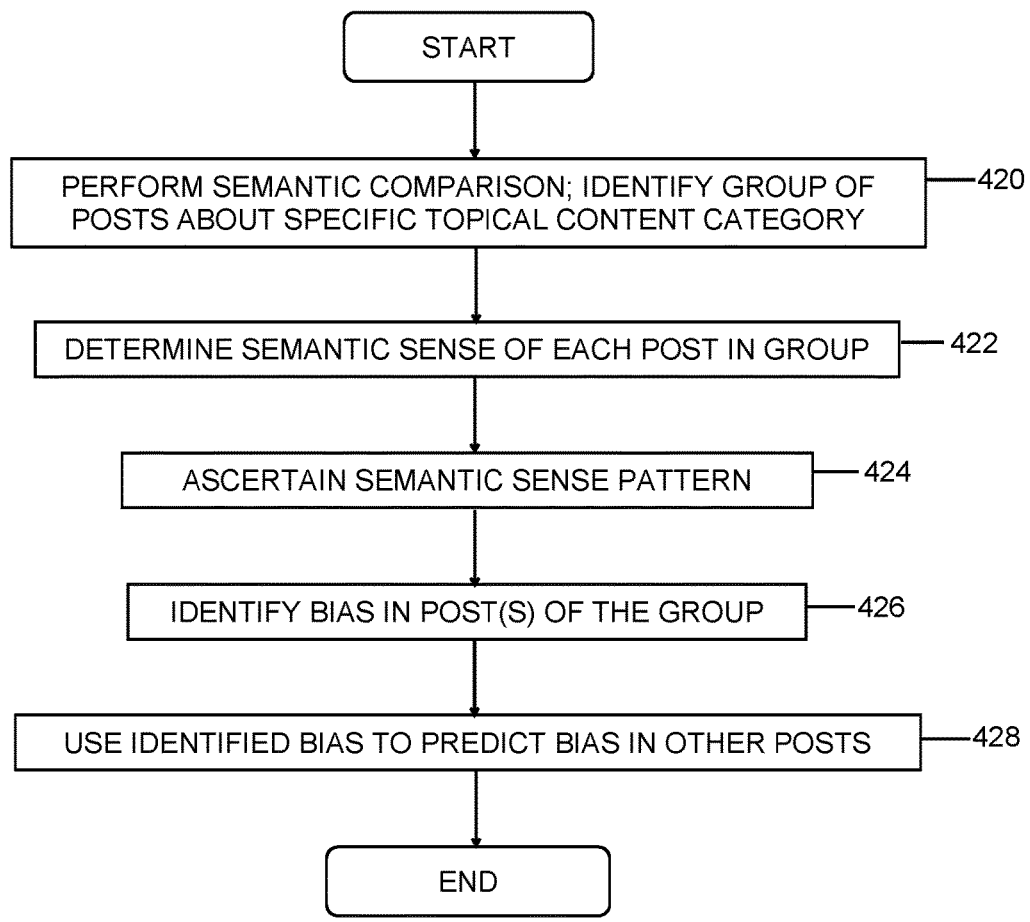
FIG. 4B depicts another example process for bias prediction in a social network environment, in accordance with aspects described herein.

FIG. 4B depicts another example process for bias prediction in a social network environment, in accordance with aspects described herein. In some examples, the process is performed by software installed on one or more computer systems, such as those described herein, which may include one or more cloud servers, such as server(s) supporting a social network.

The process of FIG. 4B performs a semantic comparison of social network posts by a user of a social network to identify a group of social network posts by the user about a specific topical content category (420). Topical content category can encompass a single topic, or, optionally, also similar or related topics. The group of social network posts by the user can include replies to content posted by other users of the social network, where the content posted by the other users is about the specific topical content category.

The process also determines a respective semantic sense of each social network post of the group of social network posts (422). The determined semantic sense of a social network post of the group of social network posts can include an indication of how strongly the user supports or opposes topical content to which the social network post is directed. The process ascertains a semantic sense pattern among social network posts in the group of social network posts about the specific topical content category (424), and identifies a bias in at least one social network post of the group of social network posts (426). The identification of the bias may be based on identifying that the respective semantic sense in each of the at least one social network post deviates from the ascertained sematic sense pattern, thus the at least one social network post are post(s) that reflect the user's bias; they deviate from what is expect from the user based on the pattern that is exhibited.

The identified bias may be selected from the group consisting of: a positive bias in support of topical content of the topical content category, or a negative bias against the topical content of the topical content category. The semantic sense pattern can indicate the user's support of the topical content, and the identified bias can identify that the least one post includes content indicating the user's opposition to the topical content. Conversely, the semantic sense pattern can indicate the user's opposition to the topical content, and the identified bias can identify that the least one post includes content indicating the user's support of the topical content.

As noted, the at least one social network post may be in reply to content posted by one or more of the others users of the social network. The process can further correlate the identified bias to at least one selected from the group consisting of: a type of relationship that exists between the user and the one or more of the other users, or a strength of relationship that exists between the user and the one or more of the other users. In some embodiments, the process correlates the identified bias to a particular other user of the other users, where the identified bias is exhibited in the user's social network posts that are replies to content posted by the particular other user. As an example, it may be identified that the user tends to agree (or disagree) with another user even though that is a deviation from the viewpoint normally taken in what the user posts replying to other users.

In further embodiments, the process identifies the bias based further on determining that the user has failed to submit a social network post in response to content that aligns with the ascertained semantic sense pattern. In this example, the process might infer that the user is actually biased when the user does not respond to a post (e.g. made by a boss, close friend, etc.) that is clearly against what the user normally supports or typically responds to.

Continuing with the process of FIG. 4B, the process uses the identified bias to predict/estimate bias in one or more other social network posts made by the user on the topical content category (428). The other post(s) may be subsequent contributions to social network chats or conversations, or contribution to any other content of the social network.

Aspects of FIG. 4B may be repeated for numerous topical content categories and numerous users. Thus, the social network posts made by the user and against which the semantic comparison is performed may be about a plurality of topical content categories. Performing the semantic comparison of the social network posts can categorize the social network posts into a plurality of groups, each about a different topical content category of the plurality of topical content categories. A process can repeat, for each other group of the plurality of groups, the determining a respective semantic sense of each social network post in the group, the ascertaining a semantic sense pattern, the identifying a bias, and the using the identified bias to predict bias in one or more other social network posts.

Although various examples are provided, variations are possible without departing from a spirit of the claimed aspects.

Figure 5:
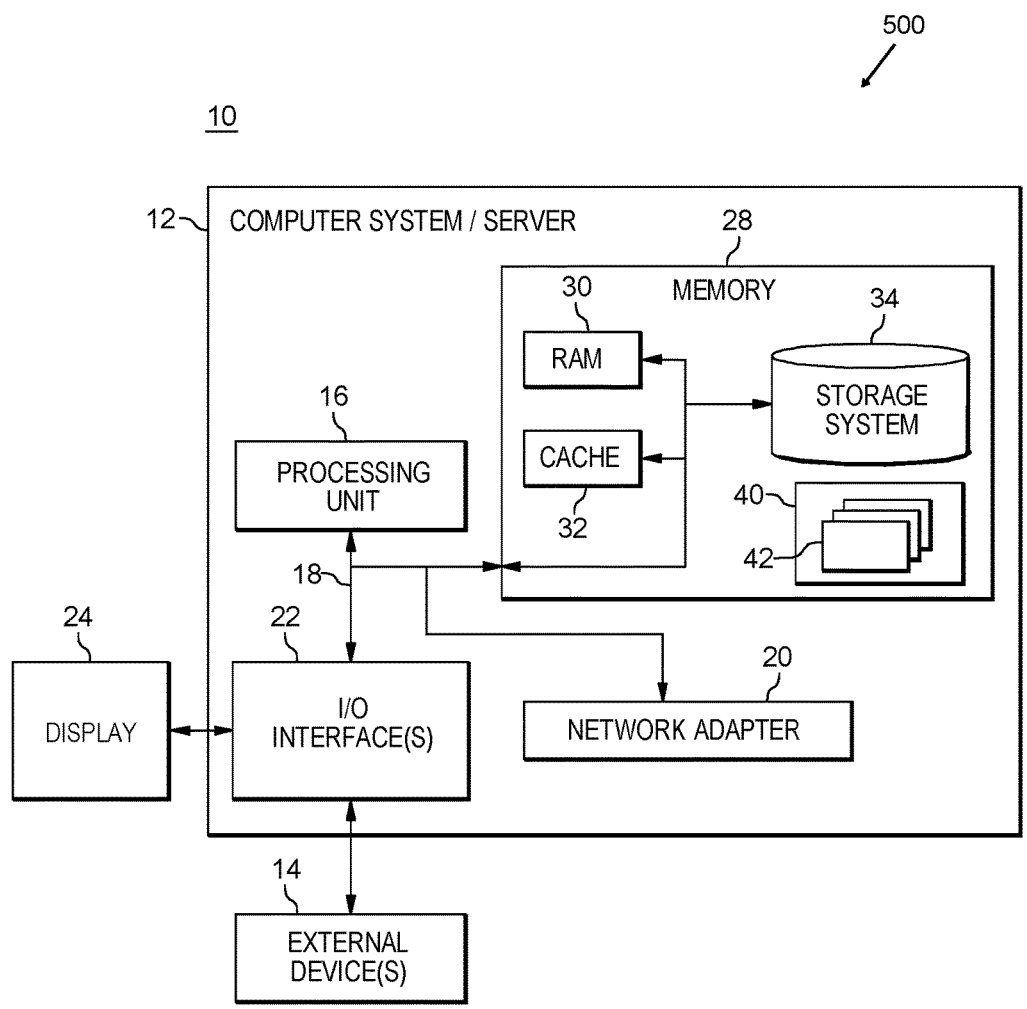
FIG. 5 depicts one example of a computer system and associated devices to incorporate and/or use aspects described herein.

Processes described herein may be performed singly or collectively by one or more computer systems, such as one or more cloud servers or backend computers (e.g. one or more social network servers). FIG. 5 depicts one example of such a computer system and associated devices to incorporate and/or use aspects described herein. A computer system may also be referred to herein as a data processing device/system or computing device/system/node, or simply a computer. The computer system may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

As shown in FIG. 5, a computing environment 500 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, workstations, laptops, handheld devices, mobile devices/computers such as smartphones, tablets, and wearable devices, multiprocessor systems, microprocessor-based systems, telephony device, network appliance (such as an edge appliance), virtualization device, storage controller set top boxes, programmable consumer electronics, smart devices, intelligent home devices, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media such as erasable programmable read-only memory (EPROM or Flash memory). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more computer application programs, other program modules, and program data. Computer programs may execute to perform aspects described herein. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Input/Output (I/O) devices (including but not limited to microphones, speakers, accelerometers, gyroscopes, magnetometers, sensor devices configured to sense light, ambient temperature, levels of material), activity monitors, GPS devices, cameras, etc.) may be coupled to the system either directly or through I/O interfaces 22. Still yet, computer system/server 12 may be able to communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter(s) may also enable the computer system to become coupled to other computer systems, storage devices, or the like through intervening private or public networks. Ethernet-based (such as Wi-Fi) interfaces and Bluetooth® adapters are just examples of the currently available types of network adapters used in computer systems.

It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
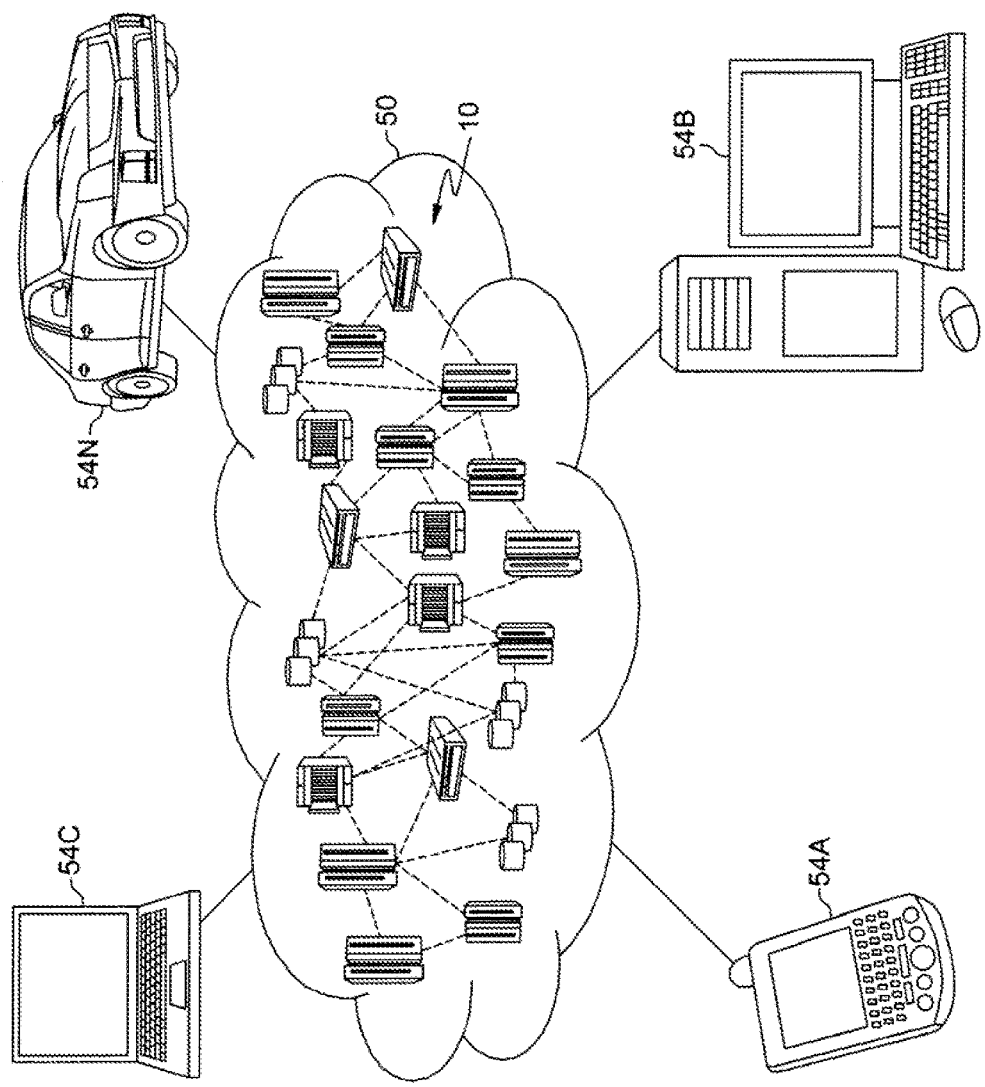
FIG. 6 depicts one embodiment of a cloud computing environment.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
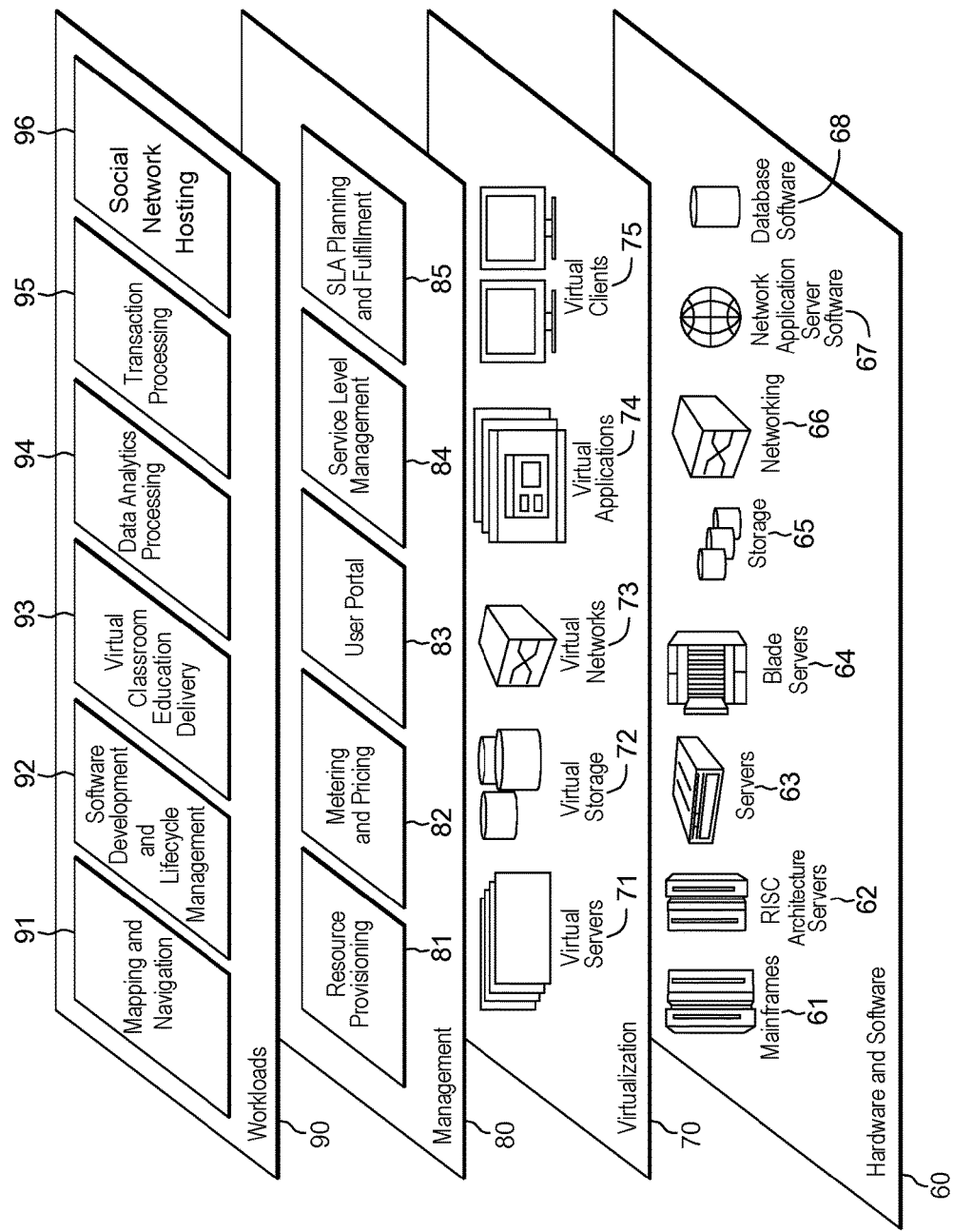
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social network hosting 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
performing a semantic comparison of social network posts by a user of a social network to identify a group of social network posts by the user about a specific topical content category;
determining a respective semantic sense of each social network post of the group of social network posts;
ascertaining a semantic sense pattern among social network posts in the group of social network posts about the specific topical content category;
identifying a bias in at least one social network post of the group of social network posts based on identifying that the respective semantic sense in each of the at least one social network post deviates from the ascertained sematic sense pattern; and
using the identified bias to predict bias in one or more other social network posts made by the user on the topical content category, wherein the determined semantic sense of a social network post of the group of social network posts comprises an indication of how strongly the user supports or opposes topical content to which the social network post is directed, wherein the semantic sense pattern indicates the user's support of the topical content, and wherein the identified bias identifies that the least one post includes content indicating the user's opposition to the topical content.

2. The method of claim 1, wherein the group of social network posts by the user comprise replies to content posted by other users of the social network, the content posted by the other users being about the specific topical content category.

3. The method of claim 2, wherein the at least one social network post is in reply to content posted by one or more of the others users of the social network, and wherein the method further comprises correlating the identified bias to at least one selected from the group consisting of: a type of relationship that exists between the user and the one or more of the other users, or a strength of relationship that exists between the user and the one or more of the other users.

4. The method of claim 2, further comprising correlating the identified bias to a particular other user of the other users, wherein the identified bias is exhibited in the user's social network posts that are replies to content posted by the particular other user.

5. The method of claim 1, wherein the identified bias is selected from the group consisting of: a positive bias in support of topical content of the topical content category, or a negative bias against the topical content of the topical content category.

6. The method of claim 1, further comprising identifying the bias based further on determining that the user has failed to submit a social network post in response to content that aligns with the ascertained semantic sense pattern.

7. The method of claim 1, wherein the social network posts by the user are about a plurality of topical content categories, wherein performing the semantic comparison of social network posts categorizes the social network posts into a plurality of groups each about a different topical content category of the plurality of topical content categories.

8. The method of claim 7, wherein the method further comprises repeating, for each other group of the plurality of groups: the determining a respective semantic sense of each social network post in the group, the ascertaining a semantic sense pattern, the identifying a bias, and the using the identified bias to predict bias in one or more other social network posts.

9. A computer system comprising:
a memory; and
a processor in communication with the memory, wherein the computer system is configured to perform a method comprising:
performing a semantic comparison of social network posts by a user of a social network to identify a group of social network posts by the user about a specific topical content category;
determining a respective semantic sense of each social network post of the group of social network posts;
ascertaining a semantic sense pattern among social network posts in the group of social network posts about the specific topical content category;
identifying a bias in at least one social network post of the group of social network posts based on identifying that the respective semantic sense in each of the at least one social network post deviates from the ascertained sematic sense pattern; and
using the identified bias to predict bias in one or more other social network posts made by the user on the topical content category, wherein the determined semantic sense of a social network post of the group of social network posts comprises an indication of how strongly the user supports or opposes topical content to which the social network post is directed, wherein the semantic sense pattern indicates the user's support of the topical content, and wherein the identified bias identifies that the least one post includes content indicating the user's opposition to the topical content.

10. The computer system of claim 9, wherein the group of social network posts by the user comprise replies to content posted by other users of the social network, the content posted by the other users being about the specific topical content category.

11. The computer system of claim 10, wherein the at least one social network post is in reply to content posted by one or more of the others users of the social network, and wherein the method further comprises correlating the identified bias to at least one selected from the group consisting of: a type of relationship that exists between the user and the one or more of the other users, or a strength of relationship that exists between the user and the one or more of the other users.

12. The computer system of claim 10, wherein the method further comprises correlating the identified bias to a particular other user of the other users, wherein the identified bias is exhibited in the user's social network posts that are replies to content posted by the particular other user.

13. The computer system of claim 9, wherein the method further comprises identifying the bias based further on determining that the user has failed to submit a social network post in response to content that aligns with the ascertained semantic sense pattern.

14. A computer program product comprising:
a computer readable storage medium readable by a processing circuit and storing instructions for execution by the processing circuit for performing a method comprising:
performing a semantic comparison of social network posts by a user of a social network to identify a group of social network posts by the user about a specific topical content category;
determining a respective semantic sense of each social network post of the group of social network posts;
ascertaining a semantic sense pattern among social network posts in the group of social network posts about the specific topical content category;
identifying a bias in at least one social network post of the group of social network posts based on identifying that the respective semantic sense in each of the at least one social network post deviates from the ascertained sematic sense pattern; and
using the identified bias to predict bias in one or more other social network posts made by the user on the topical content category, wherein the determined semantic sense of a social network post of the group of social network posts comprises an indication of how strongly the user supports or opposes topical content to which the social network post is directed, wherein the semantic sense pattern indicates the user's support of the topical content, and wherein the identified bias identifies that the least one post includes content indicating the user's opposition to the topical content.

15. The computer program product of claim 14, wherein the group of social network posts by the user comprise replies to content posted by other users of the social network, the content posted by the other users being about the specific topical content category.

16. The computer program product of claim 15, wherein the at least one social network post is in reply to content posted by one or more of the others users of the social network, and wherein the method further comprises correlating the identified bias to at least one selected from the group consisting of: a type of relationship that exists between the user and the one or more of the other users, or a strength of relationship that exists between the user and the one or more of the other users.

17. The computer program product of claim 15, wherein the method further comprises correlating the identified bias to a particular other user of the other users, wherein the identified bias is exhibited in the user's social network posts that are replies to content posted by the particular other user.

18. The computer program product of claim 14, wherein the method further comprises identifying the bias based further on determining that the user has failed to submit a social network post in response to content that aligns with the ascertained semantic sense pattern.

* * * * *

UNITED STATES PATENT AND TRADEMARK OFFICE
CERTIFICATE OF CORRECTION

PATENT NO. : 10,642,865 B2  
APPLICATION NO. : 15/413453  
DATED : May 5, 2020  
INVENTOR(S) : Munish Goyal Page 1 of 1

It is certified that error appears in the above-identified patent and that said Letters Patent is hereby corrected as shown below:

On the Title Page

In (54) and in the Specification, at Column 1, Line 2 the Title: Delete "NETWORKS" and insert
-- NETWORK --

Signed and Sealed this
Sixteenth Day of June, 2020

Andrei Iancu
*Director of the United States Patent and Trademark Office*